United States Patent
Wolfel

(10) Patent No.: US 7,499,858 B2
(45) Date of Patent: Mar. 3, 2009

(54) METHODS OF INFORMATION RETRIEVAL

(75) Inventor: Joe K. Wolfel, Watertown, MA (US)

(73) Assignee: Talkhouse LLC, Watertown, MA (US)

( * ) Notice: Subject to any disclaimer, the term of this patent is extended or adjusted under 35 U.S.C. 154(b) by 0 days.

(21) Appl. No.: 11/465,584

(22) Filed: Aug. 18, 2006

(65) Prior Publication Data

US 2008/0059150 A1    Mar. 6, 2008

(51) Int. Cl.
*G10L 15/06*     (2006.01)
*G10L 15/18*     (2006.01)
*G10L 15/28*     (2006.01)
*G06F 7/00*      (2006.01)
*G06F 17/00*     (2006.01)

(52) U.S. Cl. .............................. 704/255; 704/9; 704/10; 704/257; 704/275; 707/101; 707/102; 707/104.1

(58) Field of Classification Search .................. None
See application file for complete search history.

(56) References Cited

U.S. PATENT DOCUMENTS

| | | | | |
|---|---|---|---|---|
| 5,297,253 | A * | 3/1994 | Meisel | 715/854 |
| 5,873,064 | A * | 2/1999 | De Armas et al. | 704/275 |
| 6,192,343 | B1 | 2/2001 | Morgan et al. | |
| 6,477,499 | B1 * | 11/2002 | Yasuda | 704/275 |
| 6,484,168 | B1 * | 11/2002 | Pennock et al. | 707/6 |
| 6,603,921 | B1 * | 8/2003 | Kanevsky et al. | 386/96 |
| 6,718,308 | B1 | 4/2004 | Nolting | |
| 6,862,713 | B1 | 3/2005 | Kraft et al. | |
| 6,877,001 | B2 | 4/2005 | Wolf et al. | |
| 6,990,443 | B1 * | 1/2006 | Abe et al. | 704/222 |
| 7,027,987 | B1 | 4/2006 | Franz et al. | |
| 7,036,080 | B1 | 4/2006 | James et al. | |
| 7,143,102 | B2 * | 11/2006 | Fiennes et al. | 707/102 |
| 2001/0044719 | A1 | 11/2001 | Casey | |
| 2004/0064306 | A1 | 4/2004 | Wolf et al. | |
| 2004/0254795 | A1 * | 12/2004 | Fujii et al. | 704/277 |
| 2005/0149516 | A1 | 7/2005 | Wolf et al. | |
| 2005/0154580 | A1 * | 7/2005 | Horowitz et al. | 704/9 |
| 2006/0116997 | A1 * | 6/2006 | Yu et al. | 707/4 |
| 2006/0265388 | A1 | 11/2006 | Woelfel | |
| 2007/0112844 | A1 * | 5/2007 | Tribble et al. | 707/102 |
| 2007/0255565 | A1 * | 11/2007 | Yu et al. | 704/251 |

OTHER PUBLICATIONS

Issar, S. "Estimation of language models for new spoken language applications" Spoken Language, 4th International Proceedings on, 1996.*

Evermann et al., "Large vocabulary decoding and confidence estimation using word posterior probabilities," Proceedings of the IEEE international conference on acoustics speech and signal processing, 2000.*

(Continued)

*Primary Examiner*—David R Hudspeth
*Assistant Examiner*—Matthew J. Sked
(74) *Attorney, Agent, or Firm*—Cooley Godward Kronish LLP

(57) ABSTRACT

A method of information retrieval using a hybrid interface is provided. The method includes providing a graphical user interface having a plurality of views with a list of potential targets within each of the views, determining a selected view from a user selection of one of the views, translating a voice input into a query, and updating the selected view based on the query to assist in information retrieval.

17 Claims, 10 Drawing Sheets

OTHER PUBLICATIONS

Fujii, A. Itou, K. "Building a test collection for speech-driven web retrieval" Proceedings of the 8th European Conference on Speech Communication and Technology (Eurospeech 2003), pp. 1153-1156, Sep. 2003.*

Fujii, A. Itou, K. Ishikawa, T. "Speech-driven text retrieval: Using target IR collections for statistical language model adaptation in speech recognition" Information Retrieval Techniques for Speech Applications (LNCS 2273), pp. 94-104, Springer, 2002.*

Peter Wolf et al., "*The MERL SpokenQuery Information Retrieval System—A System for Retrieving Pertinent Documents from a Spoken Query*," Mitsubishi Electric Research Laboratories, http://www.merl.com, TR2002-57, Aug. 2004, 6 pages, including Abstract from IEEE International Conference on Multimedia Expo (ICME), Aug. 2002.

Divi, Vijay et al. "A Speech-In List-Out Approach to Spoken User Interfaces" Mitsubishi Electric Research Laboratories, TR2004-023, Dec. 2004 (6 pages).

* cited by examiner

METHODS OF INFORMATION RETRIEVAL

BACKGROUND OF THE INVENTION

The present invention relates to information retrieval, and in particular, information retrieval using a hybrid spoken and graphical user interface. Various problems regarding information retrieval and user interfaces are described below. It is to be understood that some of these problems may seem unrelated without having the benefit of this disclosure.

One problem relating to information retrieval is that relatively inexpensive storage has enabled people to assemble large personal collections of non-traditional documents, such as music files, movies, pictures, or other media files. This presents a particularly challenging information retrieval problem because these collections are becoming more portable. Traditional information retrieval interfaces that rely on full sized keyboards are impractical or undesirable in some environments. Further, the time value of such information approaches zero. That is, if the search process requires more than a moment to retrieve a picture, a song, or a movie, then it may not be worth the search time for casual enjoyment purposes. Therefore an improved user interface is desirable.

There are also problems with the use of classic information retrieval systems. Most information retrieval systems attempt to follow the probability ranking principle, which asserts that optimal retrieval is when documents are retrieved in order of the probability of relevance. This is true even for systems that are not themselves probabilistic. Google is such a system. Yet, such a system does not adequately consider the possibility that in some instances the documents may be equally relevant and where the documents are equally relevant there may be some particular order which should be used to organize the results. Similarly, consider a set of queries for which nearly all documents have a score of zero. Such a system does not consider the problems with ordering. If the same zero scoring documents always appear towards the top of the list, then at best some opportunity for serendipity is lost and at worst those irrelevant documents become a source of irritation. Such problems do not necessarily happen very often with verbose documents such as journal articles and web pages. However such problems are particularly likely to occur with documents having only brief descriptions.

Another problem with user interfaces is that associated with portable or embedded devices. Such devices tend to rely almost exclusively on menus rather than queries for searching. This works well only for very small collections. Most innovation is focused on tactile mechanisms for moving through menus. The iPod wheel is one such example of this.

There are also problems with using speech recognition in user interfaces. Speech recognition has yet to enjoy great success in user interfaces. Users have difficulty learning what they can say. Grammar based systems are particularly difficult. Human beings, unlike computers, are not good at looking at context free grammar rules and constructing valid sentences. Accuracy is often a problem. Another problem with using speech recognition in a user interface of a portable or embedded device is that speech recognition may require significant processing, memory, or other requirements which are otherwise unnecessary for the device.

Therefore, despite various advances, problems remain with providing user interfaces for information retrieval.

BRIEF SUMMARY OF THE INVENTION

Therefore, it is a primary object, feature, or advantage of the present invention to improve upon the state of the art.

It is another object, feature, or advantage of the present invention to provide a hybrid spoken and graphical user interface.

Yet another object, feature, or advantage of the present invention is to provide a user interface appropriate for selecting items from a pre-defined list of potential target items.

A further object, feature, or advantage of the present invention is to provide a user interface suitable for use in digital media library applications.

A still further object, feature, or advantage of the present invention is to provide a user interface that does not require a full computer keyboard to use.

Another object, feature, or advantage of the present invention is to provide a user interface suitable for use in portable applications.

One or more of these and/or other objects, features, or advantages of the present invention will become apparent from the specification and claims that follow. The scope of the present invention is not to be limited by or to any one or more of these objects, features, or advantages of the present invention.

According to one aspect of the present invention a method of information retrieval using a hybrid interface is provided. The method includes providing a graphical user interface having a plurality of views with a list of potential targets within each of the views, determining a selected view from a user selection of one of the views, translating a voice input into a query, and updating the selected view based on the query to assist in information retrieval.

According to another aspect of the present invention, a method of information retrieval is provided. The method includes parsing a plurality of documents into a hierarchical set of phrases, tokenizing the phrases, constructing a language model using the phrases, constructing an index for the phrases, receiving a spoken query, ranking each of the plurality of documents based on the spoken query, and updating a current view displayed to a user according to the ranking.

BRIEF DESCRIPTION OF THE DRAWINGS

FIG. 8 is a pictorial representation of a portion of a user interface showing a song view.

FIG. 9 is a pictorial representation of a portion of a user interface showing an album view.

DETAILED DESCRIPTION OF THE PREFERRED EMBODIMENT

The present invention is illustrated by way of one or more embodiments as well as variations, options, and alternatives. The present invention is not, however, to be limited merely to the specific embodiments, variations, options, or alternatives described but rather, may encompass other embodiments, variations, options, or alternatives as may be appropriate in a specific product, environment, or context.

Figure 1:
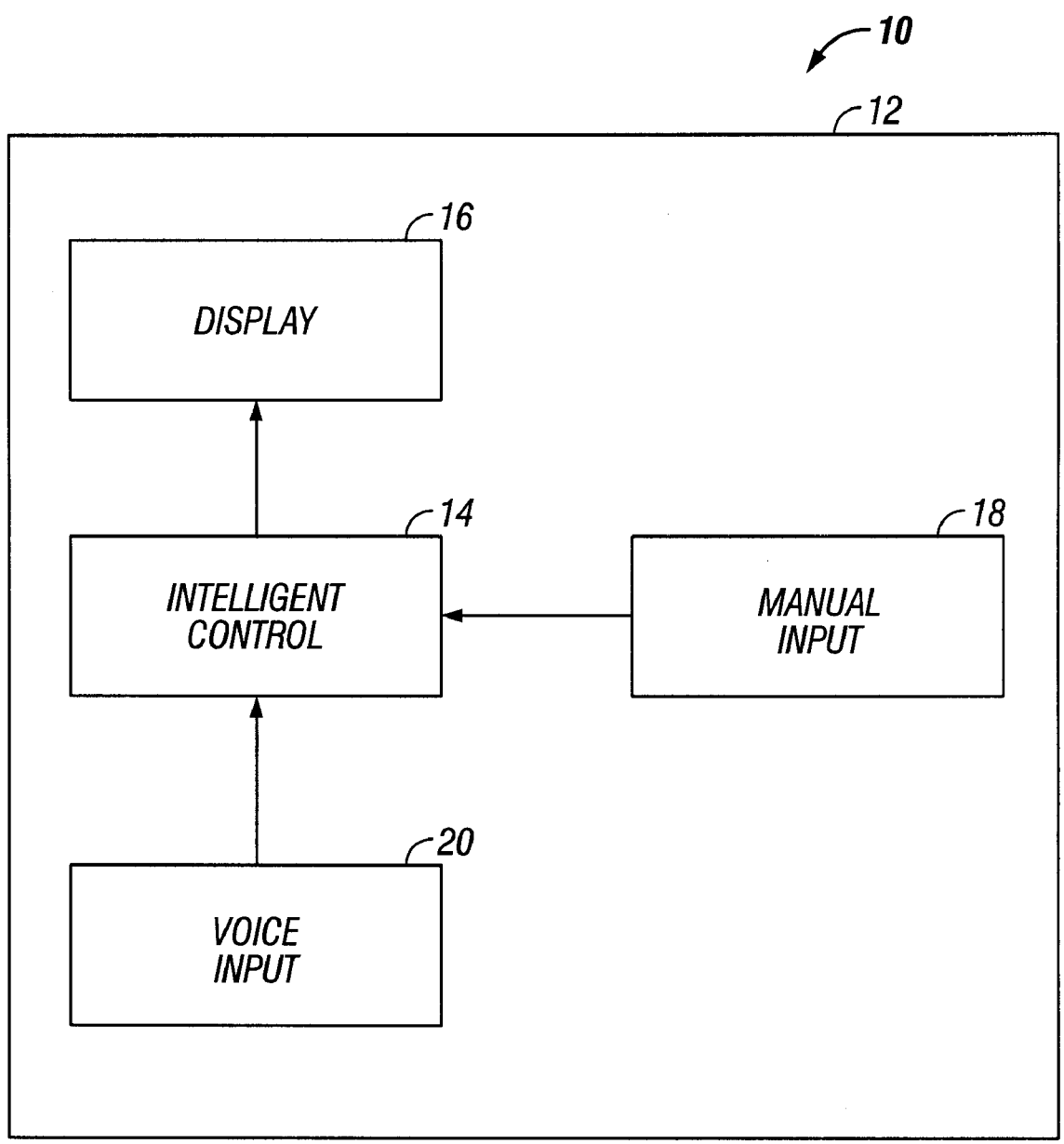
FIG. 1 is a block diagram of one embodiment of a device having an interface according to the present invention.

FIG. 1 is a block diagram of one embodiment of a device having an interface according to the present invention. As shown in FIG. 1 a device 10 has a housing 12. The device 10 can be any number of types of devices, including a general purpose computer, a portable electronic device, an embedded computing device, or other type of device. The device 10 also includes an intelligent control 14. The intelligent control 14 may be a processor, a microcontroller, an application specific integrated circuit, or other type of intelligent control. A display 16 is operatively connected to the intelligent control 14. Manual inputs 18 are also operatively connected to the intelligent control 14. The manual inputs 18 may include one or more points, pointing devices, touch operable inputs associated with the display 16 or other types of manual inputs. A voice input 20 is operatively connected to the intelligent control 14. The voice input 20 may include one or more microphones of various types. It is to be understood that any number of configurations of user input and related devices may be used. For example, the device need not be a self-contained device having a display, microphone, and user inputs. Instead a combination of devices may be used. Such devices may communicate through direct connections, wirelessly, or otherwise.

Figure 2:
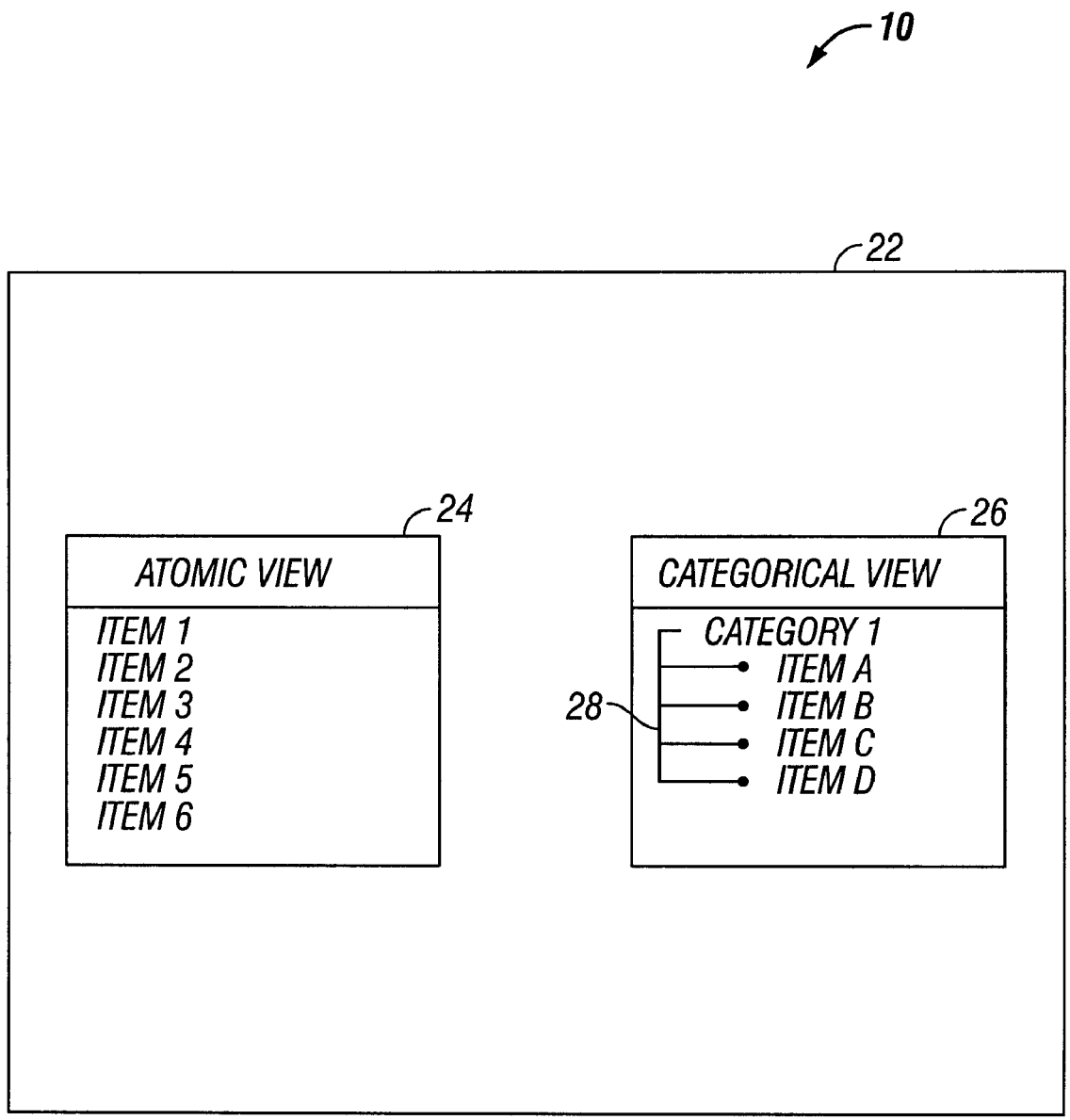
FIG. 2 is a pictorial representation of one embodiment of a graphical user interface of the present invention.

FIG. 2 is a pictorial representation of one embodiment of a graphical user interface of the present invention, the embodiment shown having multiple views. In FIG. 2, a screen display 22 is shown which includes an atomic view 24 and a categorical view 26. Although only one categorical view 26 is shown, more than one categorical view may be used. The categorical view 26 includes an organizational or hierarchical structure such as a tree 28.

The atomic view 24 is a list of all atomic documents. Atomic documents are the smallest document units that can be searched. The atomic view 24 is a table that contains a column for the name of the document, and columns for some of the categories to which the document belongs. For example, a song document in the atomic view might contain the following columns: score, artist name, album title, song title. Searchable content for the speech recognizer is constructed from the columns. The columns also serve to educate the user of the types of phrases that may be spoken. Valid phrases would typically be any partial or composite phrase constructed from the columns. Minor deviations are tolerated by techniques described later.

Categorical views such as categorical view 26 list documents that contain other documents. Categorical views are similar to the atomic view, except that, in addition to a table, for any selected row, they also display trees whose leaves are either atomic documents, or categorical documents which eventually recurse to atomic documents. All the text included in the table portion of the categorical view is acceptable language for the speech recognizer.

Figure 3:
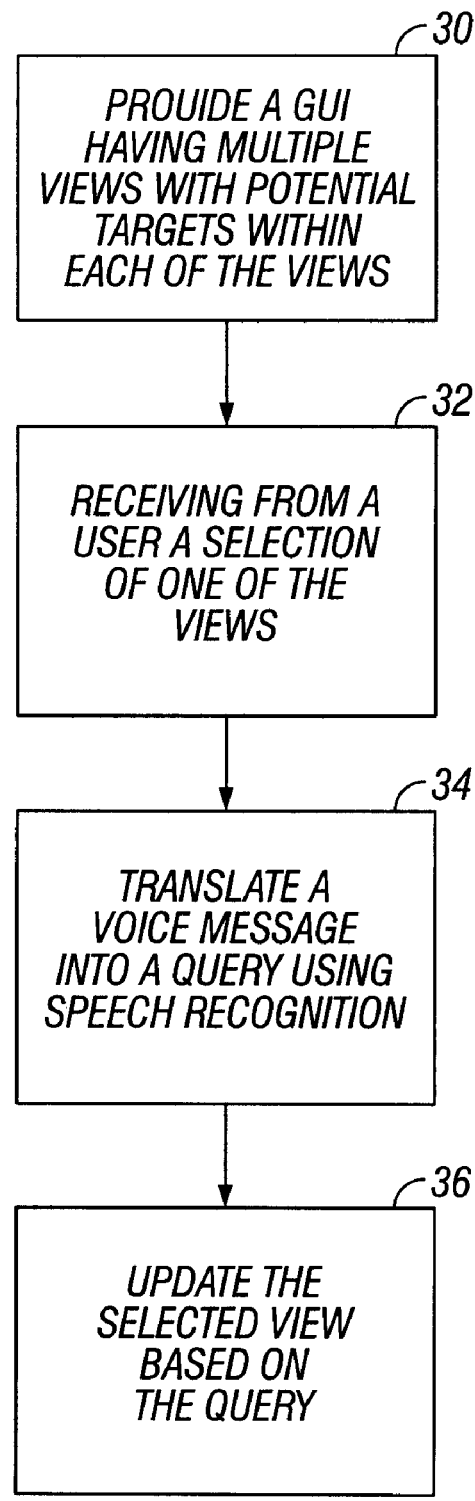
FIG. 3 is a flow diagram illustrating one embodiment of a methodology of the present invention.

FIG. 3 is a flow diagram illustrating one embodiment of a methodology of the present invention. In step 30, a graphical user interface (GUI) is provided which has multiple views with potential targets within each of the views. The multiple views can include an atomic view and one or more categorical views. In step 32, a selection of one of the views is received from the user. The selection may be made using a manual input such as a button or a pointing device. In step 34, a voice message or spoken query uttered by a user is translated into a query using speech recognition. In step 36, the selected view is updated based on the query and the relevancy of the potential targets in the view to the spoken query.

Figure 4:
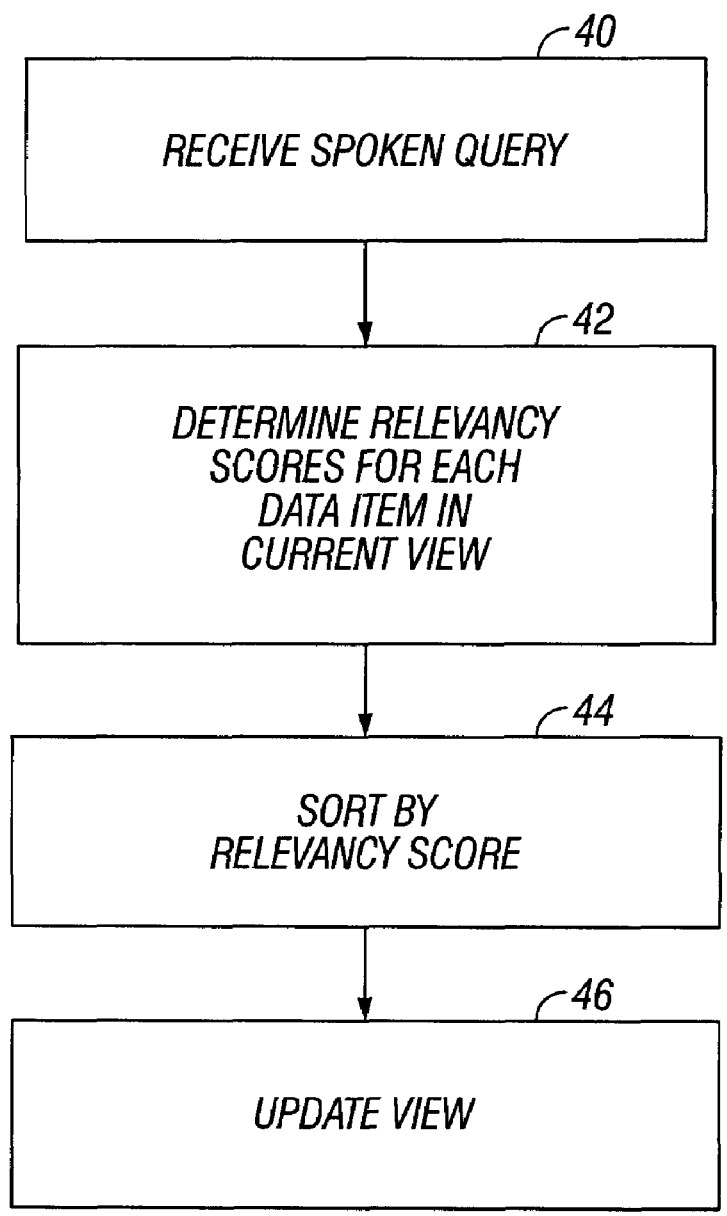
FIG. 4 is a flow diagram illustrating another embodiment of the methodology of the present invention.

FIG. 4 is a flow diagram illustrating another embodiment of the methodology of the present invention. In step 40 a spoken query from a user is received. In step 42, a relevancy score for each data item in the current view is determined. Where the view includes a table containing the data items, a relevancy score is determined for each row in the table. In step 44, the data items in the current view are sorted by relevancy score. In case of identical scores, an additional "tie breaker" score can be used. Usually this is a random number. The use of this randomization can be advantageous. Sorting algorithms will typically operate consistently to place documents having the same score in the same order. Thus, the same zero scoring documents would be placed towards the top of the list if there are few documents with positive scores at the top of the list. Doing so reduces the possibility of serendipitously placing something high on the list that the user will want to select. Doing so also reduces the training effect that can be induced by constantly exposing users to new things that they could say. In addition, doing so may also annoy and distract users as they will see the same irrelevant documents all the time. The randomization of documents having an otherwise identical score addresses these issues. In step 46, the current view is updated to reflect the order.

Figure 5:
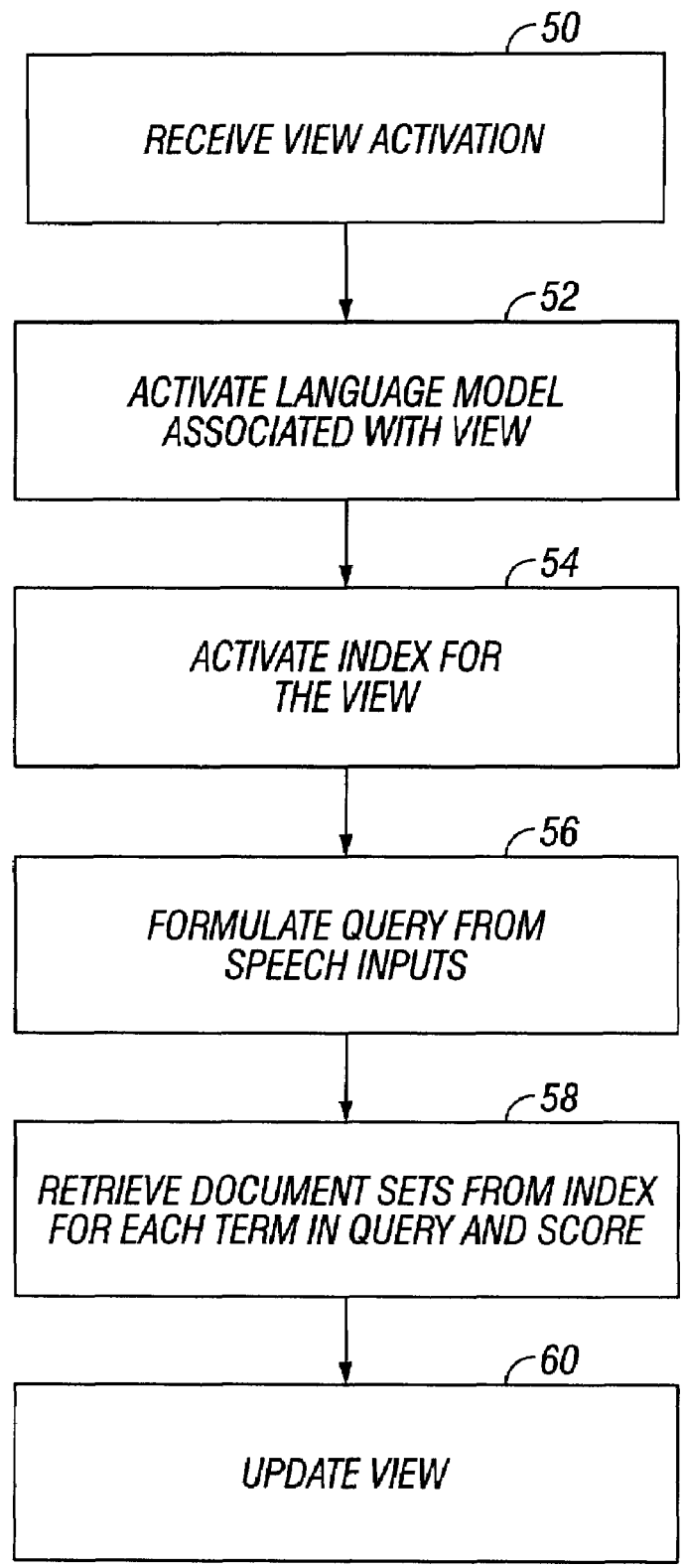
FIG. 5 is a flow diagram illustrating yet another embodiment of the methodology of the present invention.

FIG. 5 is a flow diagram illustrating yet another embodiment of the methodology of the present invention. In step 50, a view is activated by a user. The user may activate the view in any number of ways, including selecting the view with a manual input. Next in step 52, a language model associated with the view is activated. In step 54, an index for the view is also activated. In step 56 a query is formulated from speech input. In step 58, document sets are retrieved from the index for each term in the query. The document sets are also scored. In step 60, the view is updated accordingly.

Figure 6:
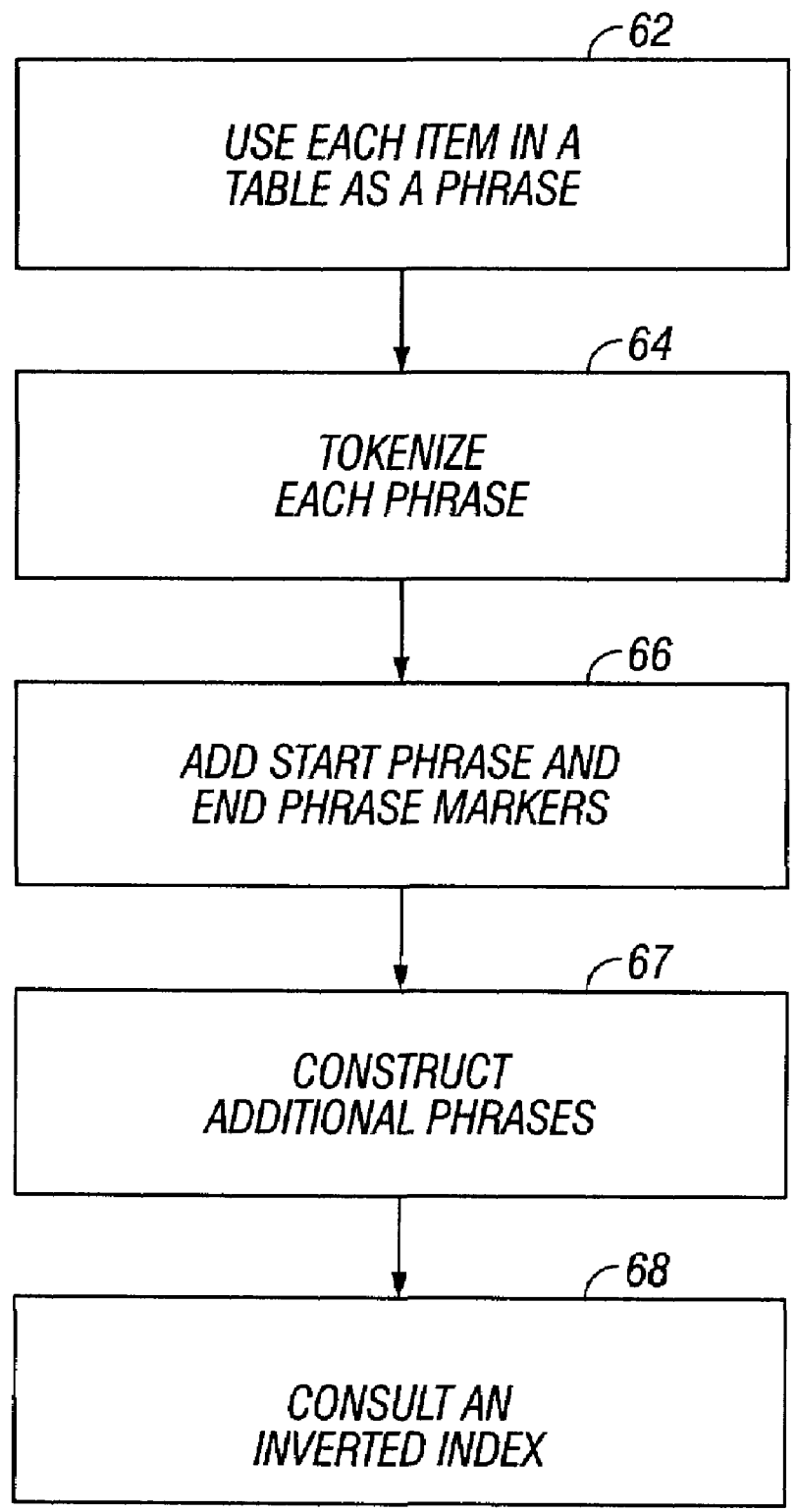
FIG. 6 is a flow diagram illustrating a further embodiment of the methodology of the present invention.

FIG. 6 is a flow diagram illustrating a further embodiment of the methodology of the present invention. In step 62, each item in a table is used as a phrase. In step 64, each phrase is tokenized. Phrases are tokenized before being included in language models and indexes. Text is processed to remove punctuation, replace abbreviations, and make other necessary substitutions. Punctuation is removed, and an ordered list of tokens is produced. Tokens may be any sound units including words, phonemes, syllables, demisyllables, etc. In step 66, start phrase and end phrase markers are added. Start and end of phrase units are also included as tokens. Pronunciation for tokens is retrieved from a dictionary. Any unknown pronunciations are guessed. A pronunciation dictionary is generated for all tokens. In step 67, additional phrases are constructed. In step 68 an inverted index is constructed. For each view with a searchable table an inverted index is constructed. The index maps terms to rows in the table. A term can be used to efficiently look up all rows containing the term. Terms are constructed from the same token lists used in language model construction. Terms are constructed for every n-gram in the token list. An n-gram is an ordered list of n-tokens. All values of n are used between 1 and a maximum cutoff. When they are part of n-grams, start phrase and end phrase tokens are also included in the index. Junk unigram tokens, e.g., "to,", "of," may be excluded from the index.

Figure 7:
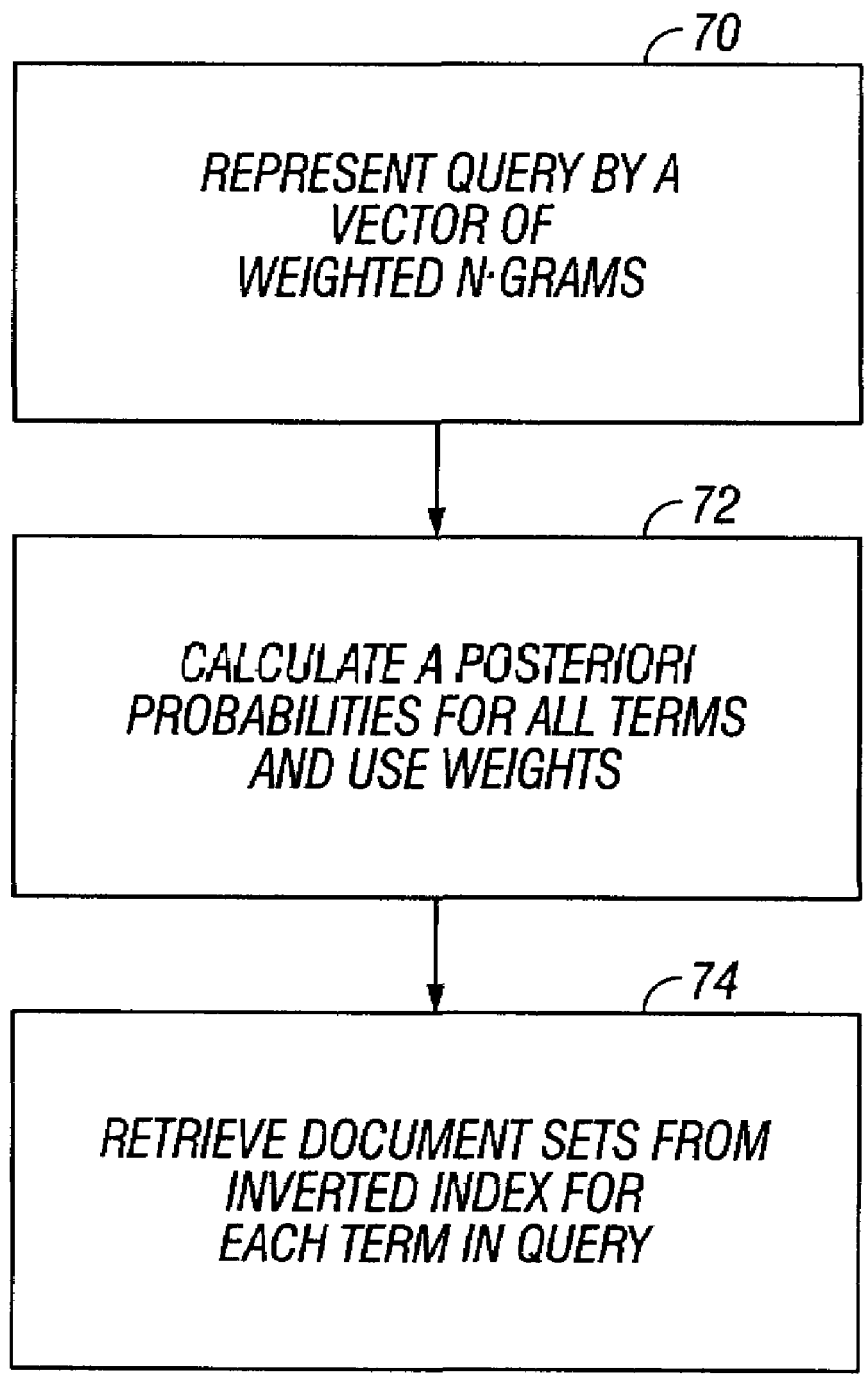
FIG. 7 is a flow diagram illustrating a still further embodiment of the methodology of the present invention.

FIG. 7 is a flow diagram illustrating a still further embodiment of the methodology of the present invention. In step 70, a query is represented by a vector of weighted n-grams. An n-gram is a construct where n tokens are linked together. In step 72, a posteriori probabilities are calculated for all terms, including n-gram terms, and used as weights. In step 74, document sets are retrieved from the inverted index for each term in the query. Silences are treated as start phrase and end phrase tokens and included in n-grams, but not individually. Silence tokens capture emphasis and information about how query utterances are delineated. N-grams and n+1-grams compete against each other. N-grams containing silences are multiplied by a constant weighing factor.

Sometimes tokens should be combined together, and sometimes they should not. As previously explained, when n tokens linked together is called an n-gram. Consider the n-grams "Bob-Marley," and "Bob-Dylan." If "Bob-Dylan" has a 95% a posteriori probability then it follows that the "Bob" unigram has at least a 95% chance of occurring. However, that particular "Bob" token would have at most a 5% chance of occurring with another unigram, such as with "Bob-Dylan." So weighting the "Bob" unigram highly is likely to reduce performance in this case. The more certain we are that an n-gram is part of a specific n+1-gram the lower we weight the n-gram.

A threshold may be used to determine whether an n-gram is part of an n+1-gram. If it is, then the a posteriori probability of the n-gram may be reduced by multiplying it by k*(1−probability(n_plus_1_gram)), where k is a constant. A similar threshold may be used to determine whether an n+1-gram is unlikely, and should have its weight reduced. The threshold may range from zero to one. The weight reduction multiplier may be j* probability(not n_plus_1_gram). Thresholds may be constant, or they may be adjusted for specific words that are particularly meaningful.

Document sets are retrieved from the inverted index for each term in the query. Terms are weighted by adjusted probabilities, and by other weights such as TF/IDF and summed for each document they belong to. Effectively, this is a weighted dot product, but more efficient than computing the score for every document. Document scores may be normalized by document length or some other metric. It should also be appreciated that query scores may also be normalized in any number of ways.

FIG. 8 through FIG. 12 illustrate various views of one embodiment of a user interface. The embodiment shown in these views provides for a user interface on a device for playing back music files. According to one embodiment of the present invention, a graphical user interface is provided having multiple views. The views include one atomic view and at least one categorical view. As previously explained, the atomic view is a list of all atomic documents. Atomic documents are the smallest document units that can be searched. The atomic view may be a table that contains a column for the name of the document, and columns for some of the categories to which the document belongs. For example, a song document in the atomic view might contain the following columns: score, artist name, album title, song title. Searchable content for the speech recognizer is constructed from the columns. The columns also serve to educate the user of the types of phrases that may be spoken. Valid phrases would typically be any partial or composite phrase constructed from the columns. Minor deviations are tolerated through techniques discussed herein or other techniques.

Categorical views list documents that contain other documents. Categorical views are similar to the atomic view, except that, in addition to a table, for any selected row, they also display trees whose leaves are either atomic documents, or categorical documents which eventually recurse to atomic documents. All the text included in the table portion of the categorical view is acceptable language for the speech recognizer.

As an example, a categorical view might represent music albums. The table portion of the view might contain a column for the artist, and the album. For any selected album, a tree would appear displaying the songs in the album. The tree could have any arbitrary depth down to the atomic documents. The album table could be sorted by speaking an artist or album name. Song names, in this view, would not be recognized.

The user interface may include two user defined categorical views. One view, the playlist view, is not editable and behaves in all regards the same as other categorical views. The second view, the playlist construction view, is capable of being displayed at the same time as other views, in contrast to the other views which are displayed only one at a time. The user can name playlists in the playlist construction view by typing or speaking. If spoken, visible category titles are displayed by guessing the pronunciation of the spoken utterance. Contents for user defined categories can be selected and copied from other views. Changes to the user construction view are immediately reflected in the non-editable user defined playlist view.

When a user utters a spoken query, relevance scores are determined for every row in the current view. The table is sorted by these relevance scores. In case of identical scores, an additional "tie breaker" score is used. Usually this is a random number so as to avoid placing the same zero scoring documents towards the top of the list if there are few documents with positive scores. Doing so increases the possibility of serendipity and assists in the training effect induced by constantly exposing users to new things that they could say. It also avoids annoying or distracting users who notice that they are seeing the same irrelevant documents all the time.

Immediately following a successful spoken query a playlist is constructed and played. The playlist is composed of all atomic documents contained within the top scoring row of the current view. For example, in artist view, a list of all songs in all albums contained by the top scoring artist would be constructed. The list would contain songs sorted by album and then track number.

Views follow a hierarchy. An artist view is higher level than an album view because artists contain albums. Spoken queries affect the current view, and any noncurrent views that are lower in a hierarchy. Lower level views are sorted to match the order of level views. This effect recurses all the way down to the atomic view. For example, a query that sorts the album also sorts the songs in the song view into the same order. Spoken queries leave higher level views unchanged.

When the user selects shuffle, the current view is randomized as well as any higher level views. Lower levels are sorted to match the current view in the same recursive method mentioned above. For example, shuffling an album view would also shuffle the artist view while the song view would be sorted to match the album view. The effect is that albums would be played in random order, but songs would be played in the normal track order for within an album.

Immediately following the shuffle function a current playlist is constructed containing all atomic documents in the newly shuffled order. Note that this list contains all atomic documents, not just the atomic documents contained within the hierarchy of the top ranked row of the current view. This is in contrast to spoken search. In an album view, for example, the effect would be to play all albums randomly, but their tracks would retain their natural order within the album.

The table portion of the views always serves to reinforce to the user what can be said. For that reason, the preferred embodiment does not typically recognize anything that would not appear in the table shown in the current view. In an album view, for example, song titles would not be recognizable, but artist names would because they are part of the album view's table. Portions of text in table columns are acceptable as are combinations of portions. In song mode, for example, the following would all be treated as acceptable input, "Satisfaction", "Rolling Stones Satisfaction", "Stones Satisfaction" or "stones <pause> satisfaction". However, "Stones Rolling" would be less acceptable. That is, it would not be included in a grammar, and if language models are used, it would be given a low probability. Although the words "Stones" and "Rolling" occur in the song view table, they never occur in that order. Since "stones" and "satisfaction" are in adjacent columns an optional pause is modeled by the system. This mechanism is described in greater detail later.

Normally, when searching with speech the result is played. However, when the editable user defined categorical view is visible, the top result is not played regardless of which view is being searched. The purpose of this is to enable faster playlist construction. This default behavior can be overridden by the user.

Figures 8, 9:
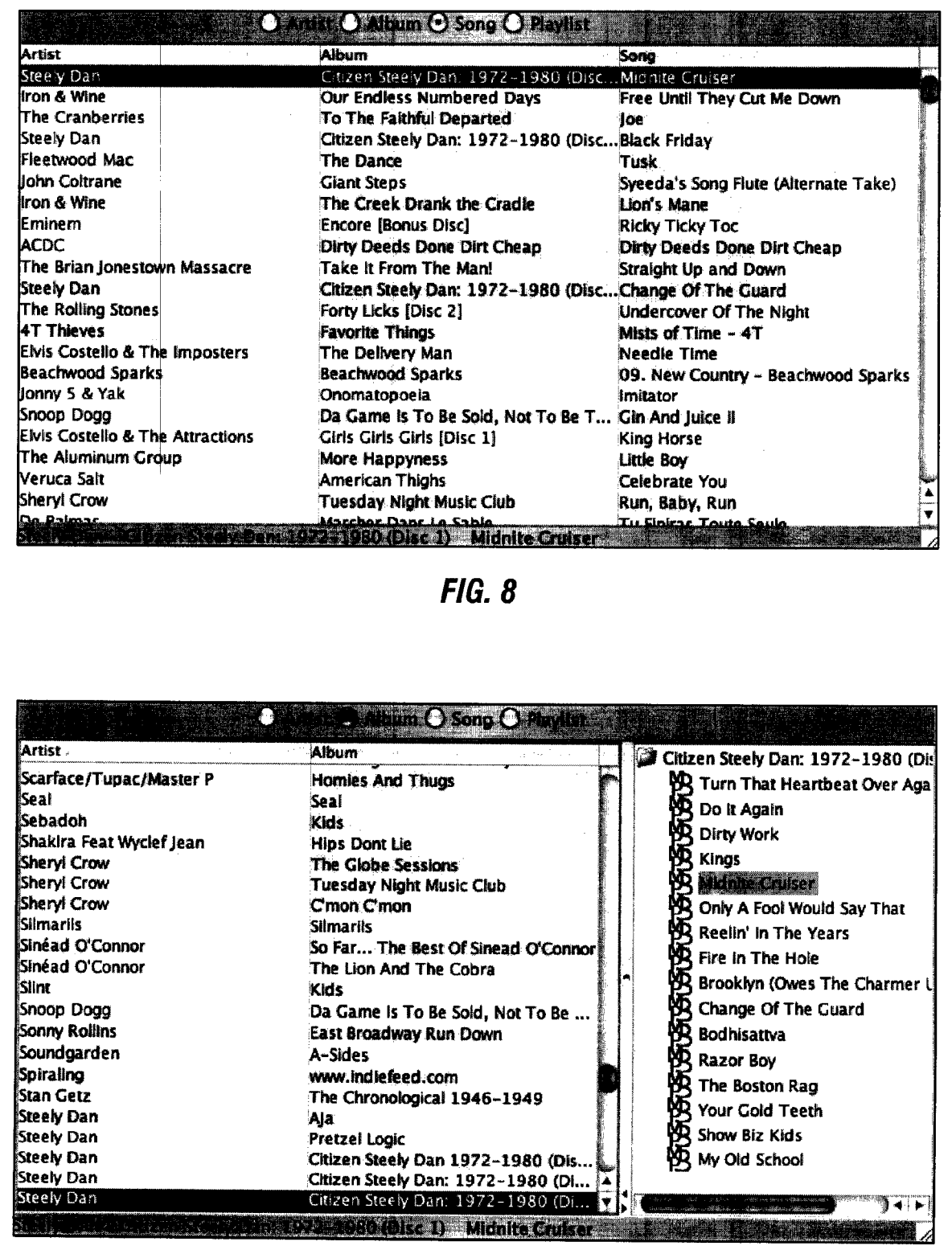

FIG. 8 is a pictorial representation of a portion of a user interface showing a song view. The song view includes a table having three columns including a first column for artist, a second column for album, and a third column for song title.

As an example, a categorical view may represent music albums. The table portion of the view may contain a column for the artist, and the album. For any selected album, a tree may appear displaying the songs in the album. The tree may have any arbitrary depth down to the atomic documents. The album table may then be sorted by speaking an artist or album name. Song names, in this view, would not be recognized.

The system may also include user defined categorical views. One categorical view may be a playlist view. A second categorical view may be a playlist construction view. The playlist view is not editable and behaves in all regards the same as other categorical views. The second view, the playlist construction view, is capable of being displayed at the same time as other views, in contrast to the other views which are displayed only one at a time. The user can name playlists in the playlist construction view by typing or speaking. If spoken, visible category titles are displayed by guessing the pronunciation of the spoken utterance. Contents for user defined categories can be selected and copied from other views. Changes to the user construction view are immediately reflected in the non-editable user defined playlist view.

FIG. 9 is a pictorial representation of a portion of a user interface showing an album view. The album view includes a table having two columns including a first column for artist and a second column for album. A second view shows a selected album, the songs on that album.

Figure 10:
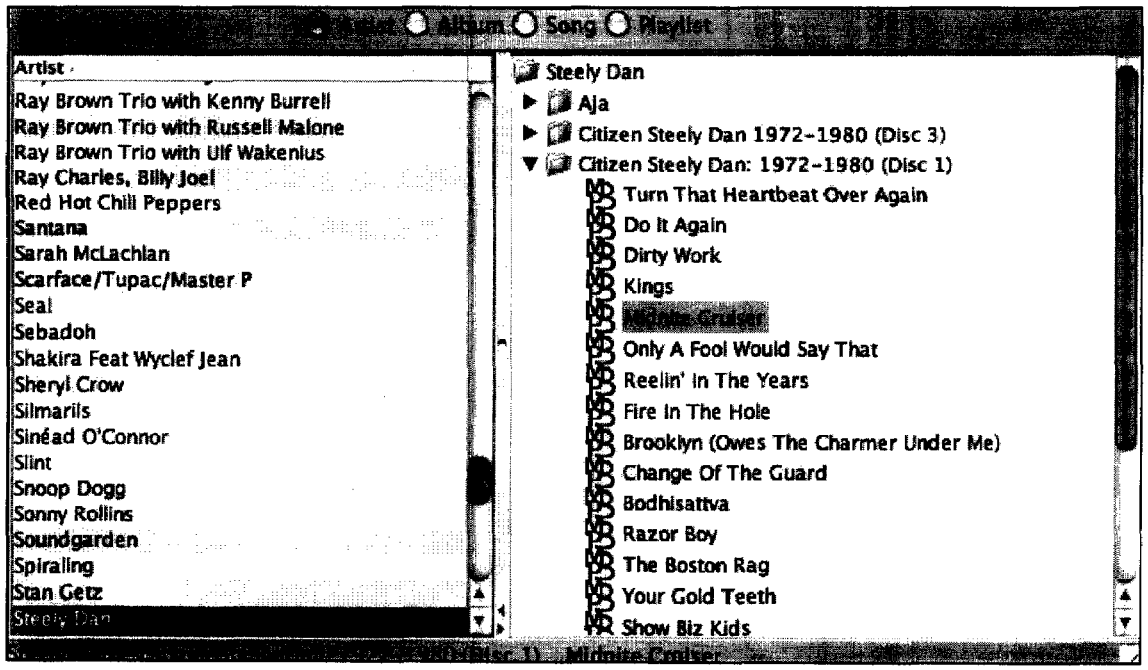
FIG. 10 is a pictorial representation of a portion of a user interface showing an artist playlist view.

FIG. 10 is a pictorial representation of a portion of a user interface showing an artist playlist view. A table of artists is shown in one view. For each artist in the table, a second view provides a tree showing albums at one level and songs of each album on another level.

Figure 11:
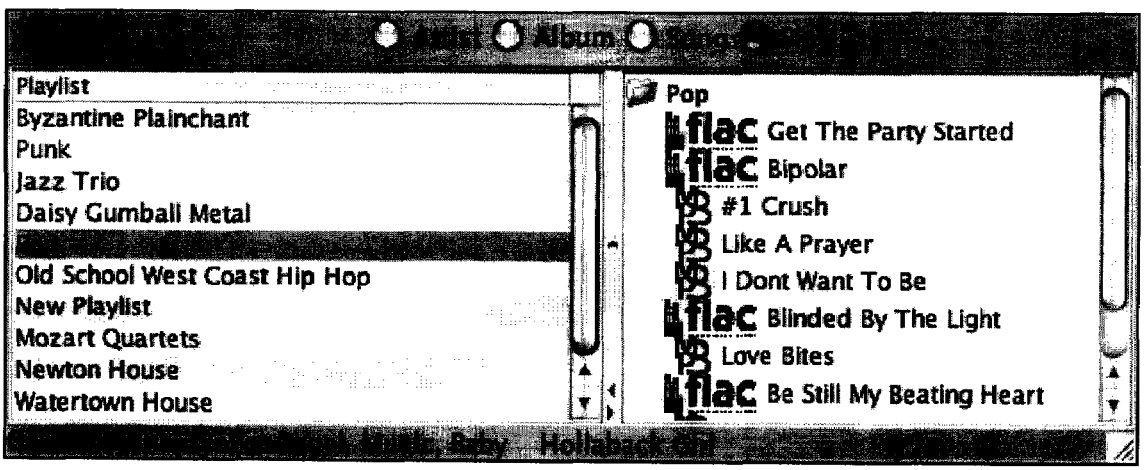
FIG. 11 is a pictorial representation of a portion of a user interface showing a playlist view.

FIG. 11 is a pictorial representation of a portion of a user interface showing a playlist view. The view for constructing new playlists includes a table containing a column for playlist names, and another column containing an ordered list of songs for each playlist. This view can be shown separately from other views such that songs, albums, artists, and other playlists can be dragged into the playlist construction view. If items are dragged onto a playlist name in the playlist construction view then the items are appended to the playlist. If items are dragged into a playlist in the construction view they are inserted at the point to which they are dragged.

The playlist construction view can be searched with speech. However, unlike other views, nothing is played. Playlists are merely reordered. The player has a silent mode, active by default, that prevents songs retrieved via speech from playing automatically when the playlist construction view is visible. The purpose of this is to not have to wait for songs to pause before issuing new queries when making song lists.

Current playlists may be constructed either through the shuffle function, or when the user performs a search. If the user invokes the shuffle function then a current playlist is created that includes all documents. The shuffle function randomizes the current view. It does not need to randomize lower order views. Lower views are sorted in their natural order. For example, randomizing a view that represents albums would present the albums in random order. However, songs within albums would be played by track number. This effect is recursive. Shuffling artists may play albums chronologically/alphabetically, and songs by track number.

Current playlists may be constructed differently for search functions. For example, only the top retrieved item may be used to construct the current playlists. For example, if the current view is album view then a playlist can be constructed using all the songs from the highest scoring album. Songs would then be placed in track number order. Similarly, if the current view is artist, then the current playlist can be constructed using all the songs sorted first by album order, and then by track number order. Album order is alphabetical by default, but optionally can be set to chronological order.

Figure 12:
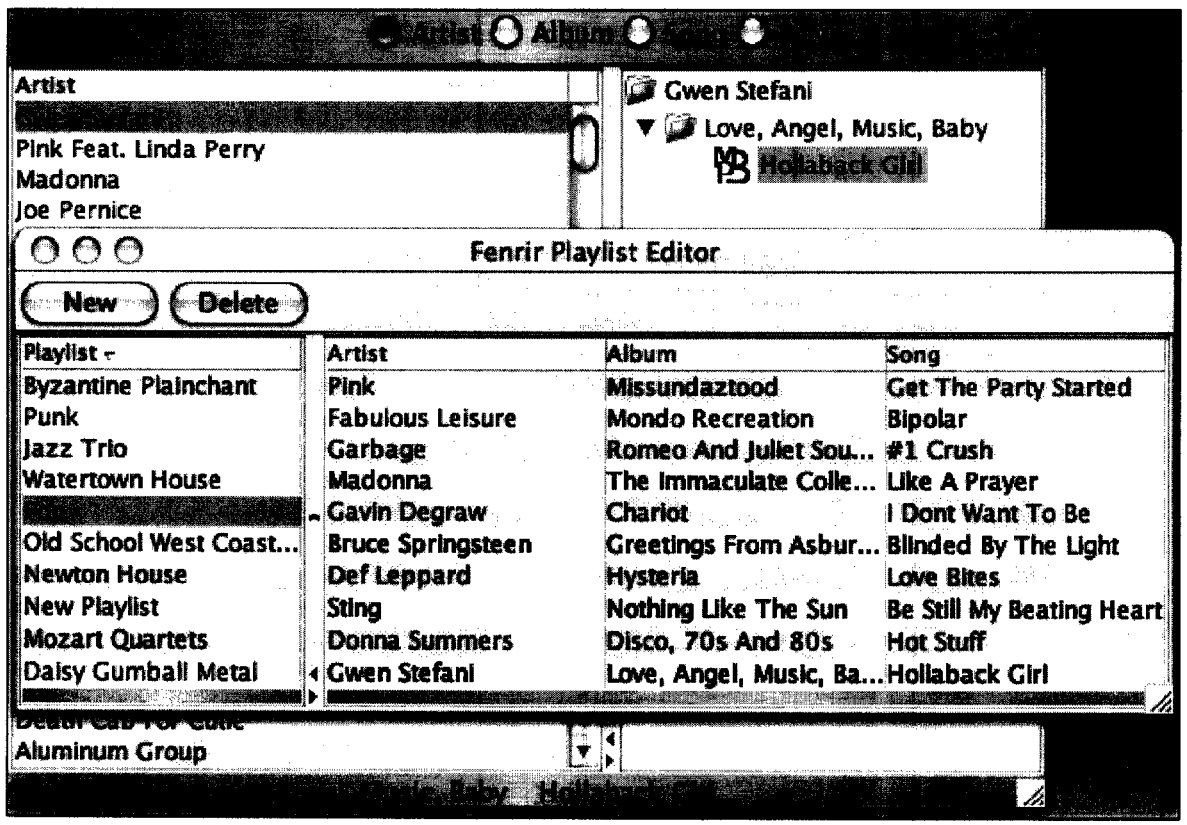
FIG. 12 is a pictorial representation of a portion of a user interface showing a playlist construction view.

FIG. 12 is a pictorial representation of a portion of a user interface showing a playlist construction view. A table containing a single column for playlists is shown. For the selected playlist, a table showing artist, album, and song is shown so that a user can select the songs to add to the playlist.

One of the advantages that the present invention can provide relates to the use of speech user interfaces. Users have difficulty remembering what they can say to speech user interfaces. The present invention presents a way of teaching the user what can be said in different contexts. Users are always shown examples from which they can deduce how to construct their own queries. Examples are visible both before and after searching. These examples always reflect the current search mode, and are carefully randomized in such a way as to avoid having the same examples repeatedly be displayed as well as maximizing the number of examples shown without interfering with search effectiveness. The teaching mechanism serves the dual purpose of facilitating browsing. This increases its effectiveness by increasing the amount of time users spend viewing phrase examples.

Another advantage of the invention relates to the use of the graphical user interface in implicitly suggesting where pauses may occur. Pauses in speech convey meaning. Speech can be delineated and emphasized using pauses. Prior art does not exploit this meaning for the purpose of information retrieval. The invention takes into account this emphasis and delineation by modeling pauses as tokens and including them in n-grams with other tokens. This captures information about where pauses occur in the context of other terms. This information can then be used when scoring documents. The interface of the invention enhances the utility of this effect by implicitly suggesting where pauses may occur. This may be accomplished by displaying phrases into distinct columns.

Additional Options, Variations, and Alternatives

Although various options, variations, and alternatives have been discussed, the present invention contemplates numerous additional variations, options, and alternatives such as may be appropriate for a particular product, in a particular environment, or context. Examples of such variations, options, and alternatives are set forth below.

There may be variations in how a user switches views. Instead of using manual inputs such as buttons to switch views, voice input may be used. For example, commands may be combined with queries. For example, a variation would allow the following phrase: "Album, Dark Side of the Moon". This command would switch to the album view and then search for dark side of the moon.

Another option, variation, or alternative is to use N-best lists instead of lattices or other approaches. Where N-best lists are used, a posteriori probabilities would then be determined based on estimates of the frequency of terms in the n-best list, or other confidence metrics.

Another option, variation, or alternative is to use grammars instead of or in addition to language models. Where language models are used, smoothing techniques such as, but not limited to, good-turing may be applied to the language models. In some instances it may be appropriate to combine language models. For example, in small portable players, it may be simpler to combine language models. Doing so may reduce accuracy slightly for some tables, but provides advantages for recognizers that cannot switch language models dynamically.

An alternative embodiment of this player could be used to retrieve other types of documents such as video, newspapers, books, or other types of documents. It is particularly applicable to content that is hierarchical or content that needs to be reorganized into specialized lists.

There may also be numerous variations in how tokenization is performed. Tokens may be any sound units including words, phonemes, syllables, demisyllables, silences, coughs, breaths, clicks, unknown sounds, etc. Tokens may also be any location based entities that serve to locate specific places in time, or relationships between other tokens. Tokens could indicate parts of speech, or other grammar-based relationships. Tokens may also be wild-cards that match anything.

There may also be variations in the user interface. For example, a column for the document's relevance score may be displayed. The column may be used to allow users to quickly re-sort by relevance after sorting by another column. Negative numbers may even be used to indicate zero scoring, and therefore randomly occurring documents.

Also, the contents of the trees need not be acyclic. For example, a playlist view could, for any selected playlist, display a tree of the contents of that playlist. The playlist could contain songs, albums, other playlists, or even itself.

There may also be addition voice commands used. However, it is believed that superfluous speech reduces the accuracy of the speech recognizer and provides a false sense of intelligence of the system. As an example, "Play The Rolling Stones" includes the extraneous word "Play". Thus, although such voice commands may be used, it is preferable that they are not.

There may also be variations in the formula used for n-gram competition.

There may also be variations in weighting of terms. Additional weights may be applied to terms, including weights for junk terms, spelling length weights, volume weights, duration weights, and term discrimination weights such as variations of TF/IDF. Emphasis weights may be applied to terms adjacent to silences and phrase boundaries. Alternative "tie breaker" scores may be used, such as track number, rather than random numbers.

Of course, there are also variations in the type of documents retrieved such as songs, movies, pictures, text, or other types of documents.

These, and other embodiments, variations, options, and alternatives are all within the spirit and scope of the invention which is not to be unduly limited to any particular embodiment described.

What is claimed is:

1. A method of information retrieval, comprising:
   parsing a plurality of documents into a hierarchical set of phrases, each of the plurality of documents including text;
   tokenizing the phrases;
   constructing a language model using the phrases;
   constructing an index for the phrases;
   receiving a spoken query;
   ranking each of the plurality of documents based on the spoken query; and
   updating a current view displayed to a user according to the ranking.

2. The method of claim 1 wherein the step of tokenizing the phrases includes tokenizing pauses.

3. The method of claim 2 wherein the pauses are treated as start phrase tokens.

4. The method of claim 2 wherein the pauses are treated as end phrase tokens.

5. The method of claim 2 wherein the documents represent songs.

6. The method of claim 2 wherein the step of ranking includes scoring each of the plurality of documents based on the spoken query and randomizing order of documents having identical scores.

7. The method of claim 2 wherein the step of ranking each of the plurality of documents based on the spoken query includes representing the spoken query by a vector of weighted N-grams.

8. The method of claim 7 wherein the step of ranking each of the plurality of documents based on the spoken query further includes calculating a posteriori probabilities for each term in the spoken query and using the a posteriori or probabilities as weights.

9. The method of claim 8 wherein the step of ranking each of the plurality of documents based on the spoken query further includes determining a ranking for each of the plurality of documents based on the a posteriori probabilities of each term in the spoken query.

10. A method of information retrieval, comprising:
    parsing a plurality of documents into a hierarchical set of phrases and tokenizing the phrases, each of the plurality of documents including text;
    adding at least one start phrase marker or end phrase marker and tokenizing the at least one start phrase marker or end phrase marker;
    constructing a language model and an index using the tokenized phrases and the tokenized at least one start or end phrase marker;
    receiving a spoken query from a user of an information retrieval system;
    retrieving one or more of the documents based on the user's spoken query and by using the language model and the index; and
    displaying to the user an updated view that includes at least some of the one or more retrieved documents.

11. The method of claim 10 wherein the index comprises an inverted index.

12. The method of claim 10 wherein a step between the receiving and retrieving steps comprises using a speech recognizer to process the spoken query.

13. The method of claim 12 wherein the retrieving step comprises using the processed spoken query, the language model, and the index to retrieve the one or more retrieved documents.

14. The method of claim 10 wherein the spoken query comprises one or more terms and further comprising the step of calculating a posteriori probabilities related to the terms.

15. The method of claim 14 further comprising the step of modifying at least one of the calculated a posteriori probabilities.

16. The method of claim 15 wherein the modifying step comprises reducing at least one of the calculated a posteriori probabilities.

17. An information retrieval method, comprising:

receiving a spoken query from a user of an information retrieval system, the system including a language model and an index constructed from tokenized phrases and at least one tokenized start phrase marker or end phrase marker, the phrases created by parsing a plurality of documents into a hierarchical set of phrases, each of the plurality of documents including text;

retrieving one or more of the documents based on the user's spoken query and by using the language model and the index; and displaying to the user an updated view that includes at least some of the one or more retrieved documents.

* * * * *